United States Patent Office 3,310,322
Patented Mar. 21, 1967

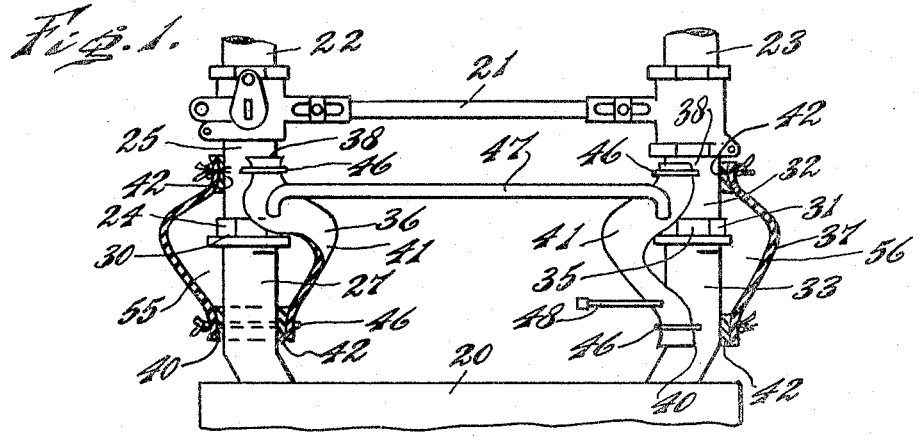
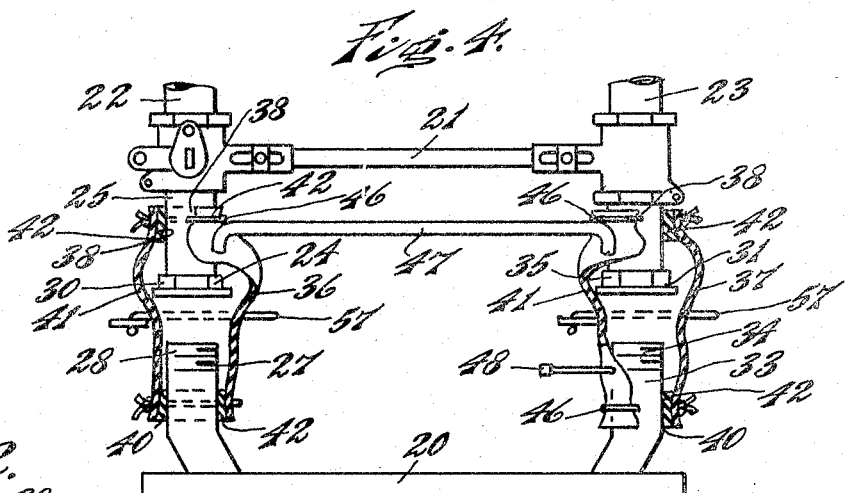
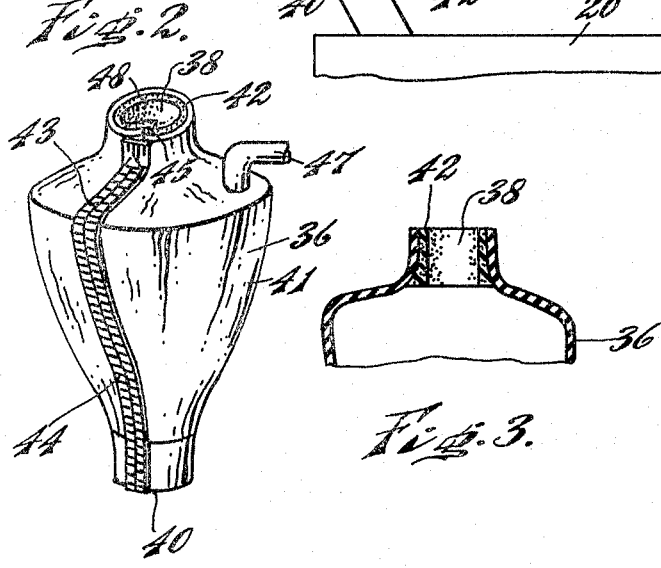
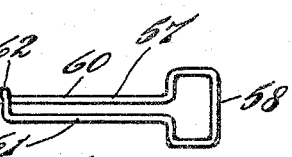

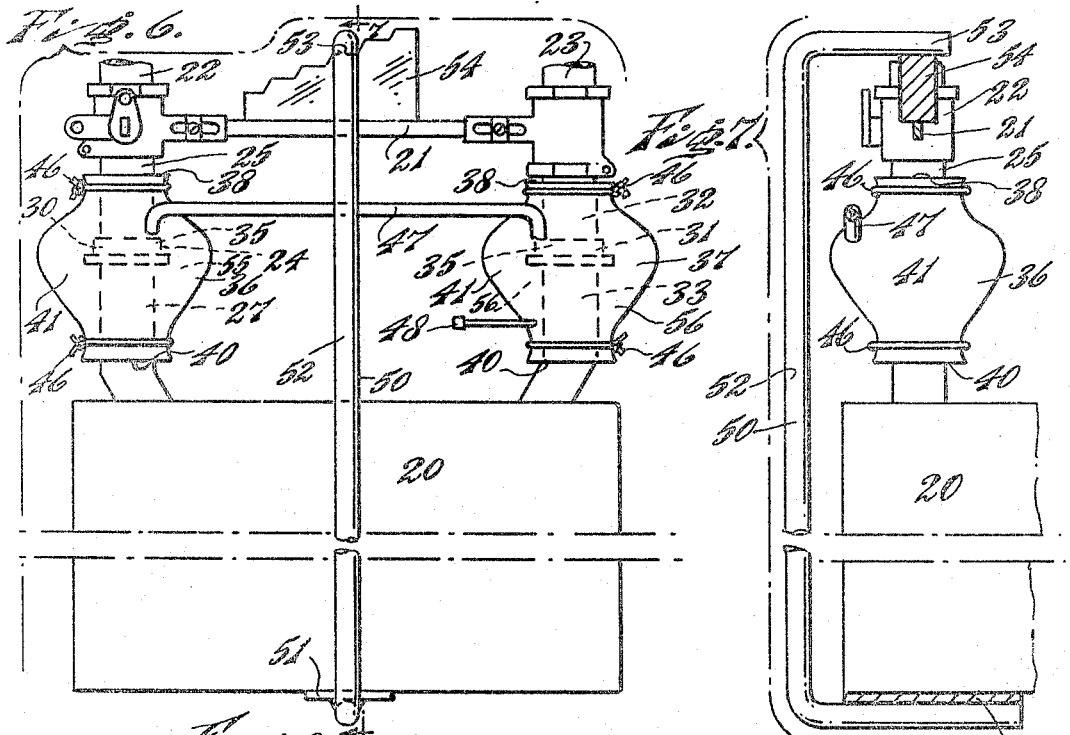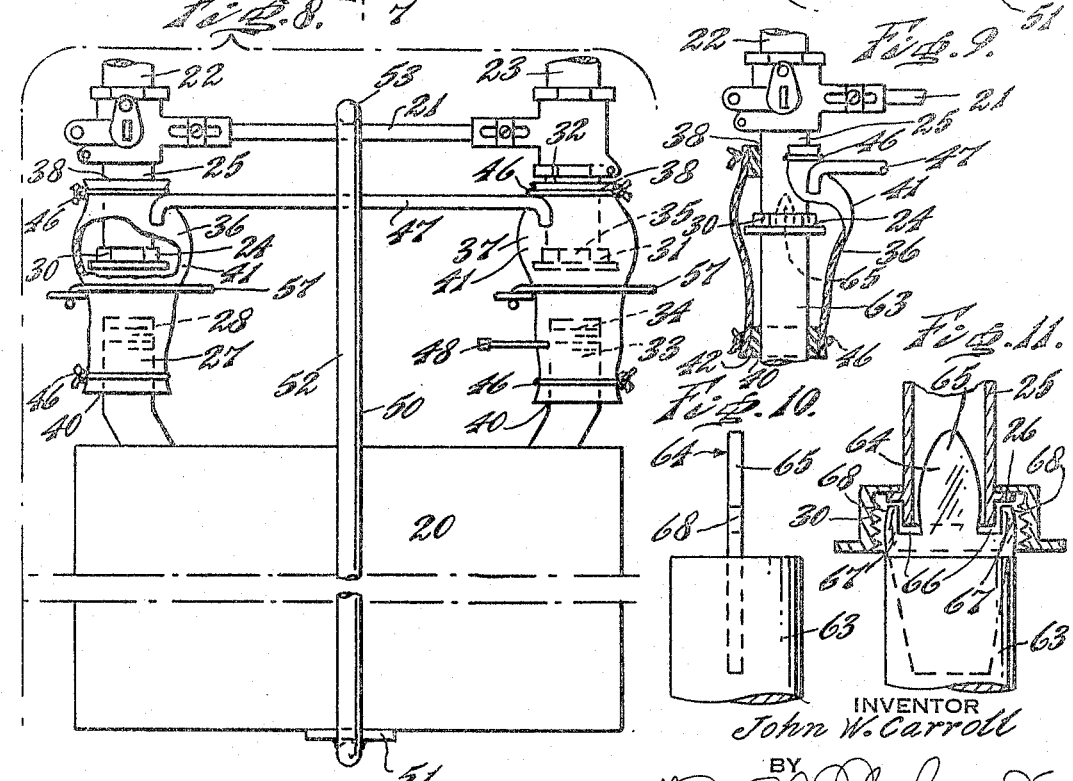

3,310,322
GAS METER CHANGE DEVICE
John W. Carroll, 32 College Ave.,
Swarthmore, Pa. 19081
Filed June 23, 1964, Ser. No. 377,327
7 Claims. (Cl. 285—18)

The present invention relates to a gas meter changing device and to a method of gas meter changing.

A purpose of the invention is to permit changing a gas meter without interrupting the service.

A further purpose is to increase the safety in changing a gas meter.

A further purpose is to reduce the cost of changing a gas meter.

A further purpose is to aid in changing a gas meter without employing devices which might encourage tampering.

A further purpose is to apply a split flexible boot around the swivel nut of an inlet union and another flexible boot around the swivel nut of an outlet union of a gas meter, to longitudinally seal the spilts in the boots in a gas tight manner, to provide annular seals to the inlet piping above and below the inlet boot, to provide annular seals to the outlet boot above and below the outlet union, to cross-connect the upper ends of the boots for bypass purposes, and to provide a purge at the lower end of the outlet boot.

A further purpose is to separate parts of the unions inside the boots and pinch the boots closed while removing the old gas meter and installing the new gas meter.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a fragmentary front elevation partly broken away showing the device of the invention installed on a meter at an early stage in the operation of changing the meter.

FIGURE 2 is an enlarged perspective of one of the boots.

FIGURE 3 is a fragmentary axial section of FIGURE 2 showing an upper seal of the boot.

FIGURE 4 is a view corresponding to FIGURE 1 showing the unions loosened and the meter lowered, and boots pinched closed.

FIGURE 5 is a plan view showing a clamp for pinching the boots closed.

FIGURE 6 is a fragmentary front elevation of the device shown in FIGURE 1 applied to a gas meter with the addition of a hook for supporting the meter so as to avoid the need for a helper and to free the hands of the workman.

FIGURE 7 is a section of FIGURE 6 on the line 7—7.

FIGURE 8 is a view similar to FIGURE 4 but showing the meter being supported by the meter supporting hook.

FIGURE 9 is a fragmentary elevation partly broken away showing the removal of a nonmetallic washer in case it becomes stuck to one side of the union and requires removal.

FIGURE 10 is a fragmentary enlarged side elevation of the tool for removing a nonmetallic washer.

FIGURE 11 is an enlarged fragmentary axial section showing the union and the tool for removing a nonmetallic washer in place against the union.

Describing in illustration but not in limitation and referring to the drawings:

It is common practice, in the distribution of city gas, to change gas meters for test at periodic intervals. In some cases statutes and regulations require this. For example, the Pennsylvania Public Utility Commission requires that once in eight (8) years each gas meter be checked for accuracy. Since it is not feasible to test a gas meter in place, it is necessary to replace the gas meter for test purposes.

Changing a gas meter is neither a simple nor inexpensive matter under present practice. It is necessary to shut off all appliances and then purge all piping before relighting the pilots. This requires that access be obtained to each house or apartment in connection with making a meter change even though the meter itself may be accessible outside the house.

I have invented a device and method which makes possible changing a gas meter without interruption of house service and without need to purge piping and relight pilots. The invention is particularly useful where meters are located out-doors or where meters in apartment houses are readily accessible, since it is no longer necessary to gain access to the premises of the customer.

Unlike some of the prior art devices which made meter changes possible without interrupting service, the device of the present invention does not involve permanent installation of any valves or fittings which might facilitate tampering with the gas service or bypassing the meter.

In the device of the invention, elastic boots preferably of rubber are provided which surround inlet and outlet unions of a gas meter and which make seals above and below to piping on both sides of each union.

The boots themselves have a slit or separable seam which permits opening so that they can be removed and reinstated at the location of another meter. The seam is sealed in a suitable way, for example, by slide fastener or zipper of the pressure-tight variety or by pressure-tight lacing.

FIGURE 1 shows a typical gas meter installation with the device of the invention applied. A gas meter 20 is supported from a meter bracket 21 which includes an inlet pipe 22 suitably extending downward and an upwardly extending outlet pipe 23.

The inlet pipe has a union 24 which includes, as well known, an inlet pipe section 25 above the union which has above the lower end a flange 26 (FIGURE 11), cooperating with a lower pipe section 27 which abuts against the upper pipe section 25 and is suitably threaded at 28 to cooperate with a swivel nut 30 which surrounds the upper pipe section 25 above the flange 26. Commonly, the lower end of the pipe section 25 is surrounded by a nonmetallic gasket suitably of rubber (not shown).

Similarly, the outlet pipe has a union 31 opposite the union 24 in the inlet pipe. The union 31 includes an upper pipe section 32 extending vertically and having a suitable flange similar to the flange 26 as already shown abutting a vertical lower pipe section 33 which is threaded on its upper end at 34 and its threads cooperate with threads on a swivel nut 35 of the union, similar to the swivel nut 30.

The device of the invention comprises flexible boots 36 and 37 preferably of elastic rubber, best seen in FIGURES 2 and 3. Each of the boots has a relatively restricted top opening 38 and a relatively restricted bottom opening 40 of a size which will closely surround the piping above and below the union.

In between the top and bottom, each of the boots is of bulbous form at 41, so as to provide ample interior space for the swivel nut and ample boot wall material for pinching the boot closed as later explained and manipulating the swivel nut inside the boot.

Each of the boots at the top and bottom has an annular seal 42 suitably of sponge rubber which will make a tight engagement with the pipe sections and prevent leakage notwithstanding any variations in the size of the pipes or roughness of the pipes.

Each of the boots has a longitudinal slit or seam 43 which permits opening of the boot to place it around a union. This longitudinal seam is sealed lengthwise in a suitable manner preferably by a slide fastener or zipper 44 of the pressure-tight variety which is capable of complete separation. One such slide fastener is described in B. F. Goodrich catalogue on Pressure Sealing Zippers current in 1963 and B. F. Goodrich catalogue on Zipper Closures for Pressure Sealing Protective Covers, also current in 1963.

It is preferable to provide a short overlapping of the annular seal at the top and bottom at the place where the longitudinal seam seal meets the annular seam as shown in FIGURE 2 at 45 to further protect against leakage. In order to guard against the possibility that there can be any unintended leakage around the annular seals I preferably wind them tightly with wire or string, 46. This is to be regarded as optional. These joints can further be protected against leakage by any well-known gas caulking compound such as laundry soap.

The top of the inlet boot 36 is connected to the top of the outlet boot 37 by a pipe or connection 47 suitably of rubber hose.

From the lower portion of the outlet boot there is a bleed connection 48, which is provided with a suitable valve, for example a threaded cap such as a tire valve cap.

The procedure for changing a meter in accordance with the invention desirably involves the following steps:

(1) In the preferred embodiment as shown in FIGURES 6, 7 and 8, provision is made for supporting the gas meter without requiring the use of a helper or complicating the problem of the gas repair man by requiring that he support the meter by one arm. For this purpose, a hook or hanger 50 is provided, having a platform 51 extending below the meter, having a vertical column 52 extending to a point above the bracket 21, and having a top hook end 53 which initially engages a stepped block or wedge 54 allowing for variations in dimensions and permitting lowering the meter while it is still supported.

(2) Using a suitable wrench, swivel nuts 30 and 35 of the respective unions are loosened until they are finger-tight and can be further manipulated by the hands.

(3) The device of the invention is then attached as shown in FIGURES 1 or 6, closing the longitudinal seam by the slide fastener 44 and anchoring the annular seals as by wire or string 46 so that the boots are tightly closed, surround the swivel nuts and do not leak.

(4) Using the hands and grasping inlet swivel nut 30 by pinching the flexible inlet boot 36, swivel nut 30 is unscrewed until union 24 is open and gas from the inlet pipe 22 enters the space 55 inside the boot and around the inlet pipe.

(5) The purge connection 48 is opened at the lower part of the outlet boot 37 and this permits gas which has entered the space 55 around the inlet boot to flow through the pipe 47 to the upper part of the outlet boot 37 through the space 56 in the outlet boot and out the purge connection 48 displacing all air until the interior of the boots and the pipe 47 are entirely filled with gas.

(6) The purge connection 48 is closed to prevent escape of gas.

(7) Manipulating with the hand through the flexible outlet boot 37, the finger-tight swivel nut 35 on the outlet union 31 is then opened. The gas meter is now supported by the hook support 52, or if this is not used, it must be supported by a workman.

(8) The meter is now lowered to the position shown in FIGURE 4 in which the upper and lower parts of the inlet and outlet unions are separated but the flow of gas can still take place through the meter because the space between the abutting ends of the pipes are surrounded by the boots. If the meter is to be lowered by using the hook this can be conveniently done as shown in FIGURE 8 by removing the block 54, and directly supporting the hook end 53 from the bracket. The meter can be supported by a workman.

(9) The boots are then pinched closed in the intervening space between the ends of the pipes. This is best done by the use of a spring clamp 57 which has a U-shaped handle 58 (FIGURE 5), opposite clamping arms 60 and 61 and a locking hook end 62 which can be snapped over the clamp arm 60 to hold the clamp tightly in place. In using the clamp of FIGURE 5, the hook end 62 is opened and a clamp is placed on two sides of each boot opposite the space between the pipes, and the boots are pinched together as best seen in FIGURES 4 and 8, and the hook end 62 locked. At this time the flow of gas through the gas meter ceases but gas continues to supply the customer by flowing through the by-pass 47.

(10) Now the hook 50 is removed and the meter is entirely removed from the boots by removing the lower tie wires, 46, and *pulling the meter downwardly* so that the pipe portions 27 and 33 disengage from and leave the lower openings 40 of the boots.

(11) In the ordinary case it will not be necessary to replace the rubber or other nonmetallic gaskets in the unions. If, however, this is required at either one or both of the unions this can be done as shown in FIGURES 9, 10 and 11. A gasket cutting tool consisting of a cylindrical handle 63 of the same diameter as the pipe portion 27 or 33 is inserted in the lower end of the appropriate boot and a wire or string at 46 is secured to complete a seal. When the gasket removing tool is inserted, of course the clamp 57 is removed, and when the gasket cutting tool is removed the clamp 57 is restored before the tool is taken out. Toward the forward end this handle carries a gasket cutting tool 64 best seen in FIGURE 11, which consists of a tapering central guide 65, which enters and loosely fits the interior of the upper pipe portion of the union, providing a recess 66 at the two sides to engage the abutting ends of the pipe. At opposite sides adjoining the flange at the gasket location there are cutters 67 which have sharp forward ends 68 which are adapted to scrape and cut away the nonmetallic gasket and clean the side of the flange 26.

The boot has sufficient flexibility and elasticity to permit at least 180° rotation of the tool. In removing the tool and the gasket, or portions thereof which have been cut loose, these are lowered into the bottom part of the boot, then the clamp 58 is restored and the tie wire 46 is removed.

(12) For restoring the gaskets after removal, new gaskets are conveniently cemented on the ends of the lower pipe sections of the new meter.

(13) The next step is to install the new meter by forcing the lower pipe sections 27 and 33 up into the lower ends of the boots holding the meter by the hook 50 as shown in FIGURE 8. The boots are then further secured at the bottom by restoring the wires or strings 46 to seal the boots to the new meter.

(14) The clamp 57 is then removed from the gas inlet side boot 36 only and the purge connection 48 is opened. Gas will then flow through the meter into the portion of outlet side boot 37 which is below the clamp, forcing the air out of the purge connection and thus purging the meter and the lower portion of the outlet boot 37.

(15) The purge connection 48 is then closed, and the clamp 57 removed from the gas outlet side boot 37.

(16) The meter is then raised, inserting the block 54 under the hook on top of the bracket 21 until the parts of the unions are in engagement end to end. The nuts are tightened to finger tightness by pinching the flexible boots to engage and turn the nuts.

(17) Next, the meter changing apparatus is removed. The block 54 and the hook 50 are removed. The wire or string 46 is eliminated and the longitudinal seams 43 are opened by opening the slide fasteners 44 and the boots and connecting tube 47 are removed.

(18) Then, using a wrench the swivel nuts are tightened.

It will be evident that the boot should be made of a material which is capable of retaining gas and is flexible. The preferable material for the boot is an elastomeric material such as rubber, synthetic rubber or an elastomeric plastic.

In view of my invention and disclosure, variations and modifications to meet individual whim or particular need will doubtless become evident to others skilled in the art, to obtain all or part of the benefits of my invention without copying the device and method shown, and I therefore claim all such insofar as they fall within the reasonable spirit and scope of my claims.

Having thus described my invention, what I claim as new, and desire to secure by Letters Patent is:

1. A gas meter changing device having a pair of flexible boots each provided with openings at opposite ends, each being separable along a longitudinal seam, each having sealing means for the longitudinal seam, and each having an annular sealing means at the openings at the opposite ends, a bypass connection from one boot to the other adjoining one end thereof, a purge connection from one of the boots adjoining the opposite end thereof and means for pinching the boots closed intermediate their ends.

2. A device of claim 1, in which the boots are enlarged at intermediate portions between the two ends.

3. A device of claim 1, in which the sealing means for the longitudinal seam comprises slide fastener means.

4. In a mechanism for removing a non-metallic washer from a union in a gas system without closing off the gas, a flexible boot having openings at opposite ends, having a longitudinal separable seam and annular seals at opposite ends, and a washer removing tool adapted to enter the interior of the boot, having a handle which seals to one of the seals of the boot and having at the forward end a guide for extending inside the union, and cutter means extending forward outside the union and adapted to cut a nonmetallic washer, there being a groove between the cutter means and the guide into which the end of the union can extend.

5. A method of changing a gas meter having inlet and outlet unions without interrupting the service, using a changing device, comprising a pair of elastic boots having openings at the opposite ends, and being separable along a longitudinal seam, a seal for the longitudinal seam and annular seals at the openings at the opposite ends, which comprises loosening swivel nuts on inlet and outlet unions on the meter until they are finger-tight, placing one boot around the inlet union and another around the outlet union, closing the seals on the longitudinal seams of both boots and closing the annular seals of both boots, manipulating the inlet swivel nut through the wall of the inlet boot to open the inlet swivel nut and allow gas to enter the space inside the inlet boot, conveying the gas from the upper part of the inlet boot to the upper part of the outlet boot so that gas enters the outlet boot, purging the outlet boot at the lower part thereof to remove air, manipulating the outlet swivel nut through the wall of the outlet boot to open the union, lowering the meter to cause separation of the unions at the outlet and the inlet inside both boots, pinching both boots closed intermediate their ends, removing the meter from the lower ends of the boots, introducing inlet and outlet union connections of another meter into the lower ends of the boots, opening the pinching of the inlet boot and allowing gas from the inlet boot to enter the meter at the inlet, purging the meter and the lower end of the outlet boot to remove air therefrom, opening the pinching of the outlet boot, raising the meter until its union connections are abutting the inlet and outlet union connections, tightening the inlet and outlet swivel nuts by manipulation through the walls of the boots until they are at least finger-tight, opening the longitudinal seams in the boots and removing the boots from the inlet and outlet unions and further tightening the inlet and outlet swivel nuts.

6. The method of claim 5, which comprises after removing the meter, inserting a washer removing tool in the lower opening of one of the boots, opening the pinching of this boot, removing the nonmetallic washer by the cutting action of the tool, withdrawing the washer removing tool, and while it still closes the lower end of the boot, pinching the boot closed and then completely removing the washer removing tool.

7. A method of changing a gas meter having inlet and outlet separable connections without interrupting the service, using a changing device comprising a pair of flexible boots having annularly sealable openings at the opposite ends and being separable along a sealable longitudinal seam, which comprises loosening the separable connections, placing one boot around the inlet connection and another around the outlet connection, closing the annular seals and the seals of the longitudinal seams of both boots, opening the inlet separable connection to allow gas to enter the space inside the inlet boot, conveying the gas from the upper part of the inlet boot to the upper part of the outlet boot so that gas enters the outlet boot, purging the outlet boot at the lower part thereof to remove air, opening the outlet separable connection, lowering the meter sufficiently to permit pinching both boots closed intermediate their ends, pinching both boots closed intermediate their ends, removing the meter from the lower ends of the boots, introducing inlet and outlet connections of another meter into the lower ends of the boots, opening the pinching of the inlet boot and allowing gas from the inlet boot to enter the meter at the inlet, purging the meter and the lower end of the outlet boot to remove air therefrom, opening the pinching of the outlet boot, raising the meter to close the separable connections, opening the longitudinal seams in the boots and removing the boots from the connections, and tightening the separable connections.

References Cited by the Examiner

UNITED STATES PATENTS

| 473,008 | 3/1892 | Lynch | 81—8.1 |
|---|---|---|---|
| 1,195,220 | 8/1916 | Hendren | 81—8.1 |
| 1,289,615 | 12/1918 | Berg | 15—104.2 |
| 2,579,656 | 12/1951 | Douglas et al. | 285—30 X |
| 2,689,563 | 9/1954 | Huber | 251—4 X |
| 2,708,123 | 5/1955 | Risley et al. | 285—119 X |
| 3,086,797 | 4/1963 | Webb | 251—7 X |
| 3,114,567 | 12/1963 | Colley | 285—81 |
| 3,148,690 | 9/1964 | Petersen | 137—15 |
| 3,148,699 | 9/1964 | Shindler | 137—312 |

CARL W. TOMLIN, *Primary Examiner.*

THOMAS F. CALLAGHAN, *Examiner.*

D. W. AROLA, *Assistant Examiner.*